Dec. 21, 1965 S. POLONSKY 3,224,062
ATTACHMENT AND SPACING MEANS
Filed March 23, 1964
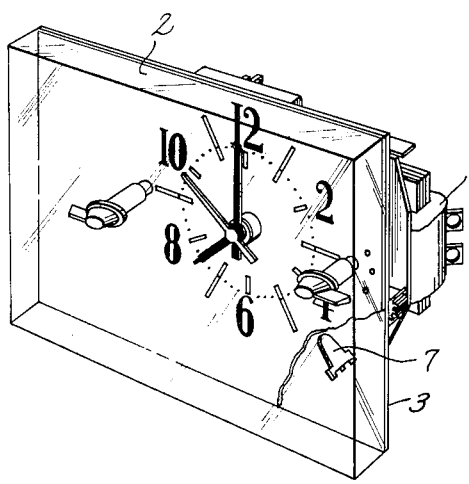
Fig. 1.
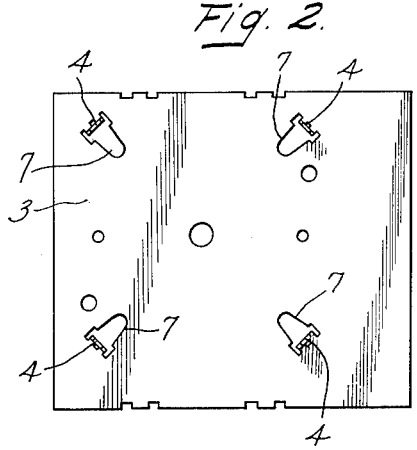
Fig. 2.
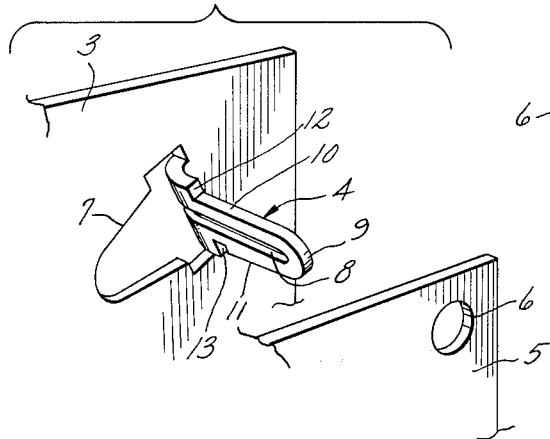
Fig. 4.
Fig. 3.
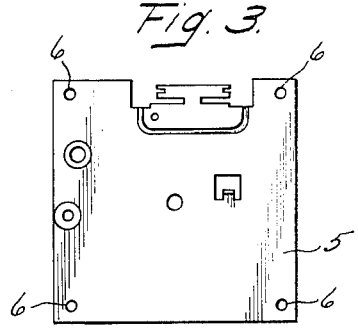
Fig. 5.
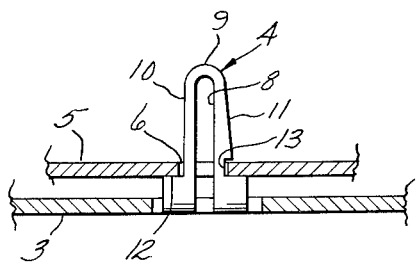
Fig. 6.
Inventor:
Samuel Polonsky
by Bernard Blatt
His Attorney

United States Patent Office 3,224,062
Patented Dec. 21, 1965

3,224,062
ATTACHMENT AND SPACING MEANS
Samuel Polonsky, Medway, Mass., assignor to General Electric Company, a corporation of New York
Filed Mar. 23, 1964, Ser. No. 353,838
1 Claim. (Cl. 24—214)

My invention relates to attachment and spacing means, and particularly to means for attaching a plate in spaced relation upon a second plate or mounting member.

A problem is recognized today in finding a way of joining a first plate to a second plate or mounting member in a spaced, parallel relationship in such a manner that cumbersome and expensive spacing sleeves are not required, and the plate can be easily and quickly attached or removed. The most common way of joining two plates in a parallel, spaced attitude is to pass a conventional fastener, such as a bolt, through apertures in the plates to be attached, spacing the plates with sleeves or other similar articles, and securing the plates together with the fastener. This type of mounting arrangement has the disadvantages of excessive assembly time, inconvenience of handling the many separate parts, and high expense. The present invention obviates these disadvantages and provides an attachment and spacing means in which a unitary structure may be easily and quickly mounted in the desired spaced relationship.

It is an object of this invention to provide an improved means for attaching one plate to a second plate or mounting member in spaced relationship.

It is another object of this invention to provide a means for attaching one plate to a second plate or mounting member in a spaced relationship wherein the spacing and securing function is accomplished with a minimum of parts.

It is still another object of my invention to provide an attaching and spacing means which is easier to attach and more economical to produce than present attachment means.

Further object and advantages of my invention will become apparent as the following description proceeds. The features of novelty which characterize my invention will be pointed out with particularity in the claim annexed to and forming a part of this specification.

Briefly summarizing my invention, in one embodiment thereof, I provide a means for attaching a first plate to a second plate or mounting member in a parallel, spaced relationship. This means comprises mounting tabs which are struck from the first plate and bent substantially perpendicular to the plane of the plate. Each tab has a resiliently deformable, tapered side and a securing notch at the base of the taper adjacent an integral shoulder. The second plate or mounting member is provided with an aperture. The first plate is attached to the second plate by merely forcing the tab into the aperture against the outward bias of the tapered edge until the aperture rim snaps securely into the notch. The shoulder adjacent the notch is spaced from the plane of the first plate in order to separate the plates by a predetermined amount.

For a better understanding of my invention, reference may be made to the accompanying drawing in which:

FIG. 1 is a perspective view, partly broken away, showing my attachment and spacing means in an electric clock.

FIG. 2 is a view of a plate and its mounting tabs.

FIG. 3 is a view of a mounting member for the plate showing tab-receiving apertures in the member.

FIG. 4 is a close-up view of a plate mounting tab and mounting member aperture aligned for engagement.

FIG. 5 is a sectional view of the plate being attached to the mounting member.

FIG. 6 is a sectional view similar to FIG. 5, but showing the plate attached to the mounting member.

By reference to the drawing, particularly to FIG. 1, it will be seen that my attachment means can be employed to a mount a timer 1 behind a clock dial face 2, a use for which it has particular suitability. FIG. 2 shows an adapter plate 3 incorporating a plurality of the mounting tabs 4 which constitute the essence of my attachment means. When utilized in a clock embodiment, the adaptor plate 3 enables the clock dial face 2 to be mounted in front of a timer back plate 5. The timer back plate 5 is shown in FIG. 3. The back plate 5 has circular apertures 6 arranged in correspondence with the tabs 4 on the adaptor plate 3 in order to receive the tabs 4 during the attachment operation.

FIG. 4 shows my attachment means in detail. Each mounting tab 4 is struck from the adaptor plate 3 and bent substantially perpendicularly to the plane of the adaptor plate 3. Cut-out 7 is formed in the adaptor plate 3 by the stamping operation. A slot 8 incised in the interior of the tab 4 gives the tab 4 the shape of a loop having a nose 9 and sides 10, 11. The slot 8 in the tab interior gives the tab sides 10, 11 resiliency.

Side 11 of the loop is tapered or sloped toward the nose 9 of the tab 4 to give the tab a wedge shape. The wedge shape of the tab 4 and the resiliency of its sides facilitate insertion of the tab 4 into the aperture 6 in the back plate 5. Whereas the tab 4 of my attachment means is shown in the drawing in the form of a loop having sides 10, 11 connected by a rounded end or nose 9, it is evident that the tab 4 could also be formed without the connecting end. The tab 4 would then comprise spaced resilient fingers capable of being deformed toward each other. To create the wedge effect the fingers could be formed convergingly, or one or both provided with a tapered outer edge.

A shoulder 12 is formed in the tab 4 at a set distance from the base of the tab 4 to provide a predetermined spatial separation of the adaptor plate 3 from the back plate 5 when the two are attached.

A notch 13 in the tapered side 11 of the tab 4 immediately above the shoulder 12 receives the edge of aperture 6 when the timer back plate 5 is in its final mounted position upon the adaptor plate 3, thus securing the back plate 5 upon the adaptor plate 3.

FIG. 4 shows the timer back plate 5 as being provided with a circular aperture 6 for the reception of the mounting tab 4. Whereas a circular aperture does offer the most advantageous engageable edge for the tab 4, it is manifest that my invention may be used to attach a plate to any mounting member offering an engageable edge or edges arranged to cooperate with the mounting tabs 4.

The attachment operation will be best understood by referring to FIGS. 5 and 6. The adaptor plate 3 is secured in a spaced relationship upon the timer back plate 5 merely by inserting the nose 9 of the tab 4 into the aperture 6 in the back plate 5 and forcing the plate 3 toward the back plate 5 until the edge of the aperture 6 in the back plate 5 snaps into the tab notch 13 and against the shoulder 12. It is important to note that as the mounting tab 4 is being forced into the aperture 6 in the back plate 5, the taper of tapered side 11 causes an ever-increasing impeditive effect on the progress of the tab 4. This impeditive effect is partially compensated for by the inherent resiliency of the tab sides 10, 11 due to the slot 8 in the interior of the tab 4. It is manifest then that when the tabe 4 has penetrated the aperture 6 in back plate 5 to the shoulder 12, the inherent outward bias of the tab sides 10, 11 will cause the back plate 5 to snap securely in place into the notch 13 and thus preclude any unintentional movement of the back plate 5 away from the adaptor plate 3.

Whereas my invention has been depicted as being utilized in a clock for attaching an adaptor plate to a timer, it will be evident that my attachment means can be used to attach a plate to many types and configurations of mounting members and is not restricted to use in a clock embodiment. I contemplate that various and other modifications and applications will occur to those skilled in the art. It is therefore my intention that the appended claim shall cover such modifications and applications as do not depart from the true spirit and scope of my invention.

What I claim as new and desire to secure by Letters Patent of the United States is:

Attaching and spacing structure comprising: a mounting member having an aperture provided with opposed inside surfaces, a metal mounting plate, a mounting tab stamped from said plate by removing metal between the periphery of said tab and an opening formed in said plate during the stamping operation, said tab being deformed so as to project substantially perpendicularly from the plane of said plate, said tab comprising a loop with substantially parallel elongated portions and a rounded nose connecting said portions, each of said substantially parallel portions including a flat side surface having a width equal to the thickness of said metal mounting plate, one of said side surfaces being tapered toward the end of said tab, said opposed inside surfaces of the aperture in the mounting member being slidable on the flat side surfaces of said substantially parallel portions to deform said portions as the tab is forced into the aperture in the mounting member, a stop shoulder formed in said tab at a predetermined distance from the plane of said plate for abutting the mounting member to provide a predetermined spacing of said plate from the mounting member, and a notch in the outer edge of said tapered side adjacent said shoulder for engaging an edge of said aperture on the mounting member for holding said plate and the mounting member in predetermined spaced relationship.

References Cited by the Examiner
UNITED STATES PATENTS

| | | | |
|---|---|---|---|
| 1,936,507 | 11/1933 | Green | 89—85 |
| 2,238,856 | 4/1941 | Churchill | 24—73 |
| 2,721,245 | 10/1955 | Arisman et al. | 338—197 |

FOREIGN PATENTS 79,195 3/1919 Switzerland.

References Cited by the Applicant
UNITED STATES PATENTS

| | | |
|---|---|---|
| 2,994,183 | 8/1961 | Diamond et al. |
| 3,033,948 | 5/1962 | Boyles. |

WILLIAM FELDMAN, *Primary Examiner.*

DONLEY J. STOCKING, *Examiner.*

E. SIMONSEN, *Assistant Examiner.*